(12) United States Patent
Kawamura et al.

(10) Patent No.: US 10,207,441 B2
(45) Date of Patent: Feb. 19, 2019

(54) MOLDING DIE AND DIE-EXCHANGING METHOD

(71) Applicant: DENSO CORPORATION, Kariya, Aichi (JP)

(72) Inventors: Atsushi Kawamura, Kariya (JP); Masato Ichikawa, Kariya (JP); Masami Gotoh, Kariya (JP); Tsuyoshi Arai, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 147 days.

(21) Appl. No.: 15/512,250

(22) PCT Filed: Nov. 12, 2015

(86) PCT No.: PCT/JP2015/005647
§ 371 (c)(1),
(2) Date: Mar. 17, 2017

(87) PCT Pub. No.: WO2016/075943
PCT Pub. Date: May 19, 2016

(65) Prior Publication Data
US 2017/0291339 A1   Oct. 12, 2017

(30) Foreign Application Priority Data

Nov. 13, 2014   (JP) .................. 2014-230697

(51) Int. Cl.
*B29C 45/26* (2006.01)
*B29C 33/30* (2006.01)
(Continued)

(52) U.S. Cl.
CPC .......... *B29C 45/401* (2013.01); *B29C 33/306* (2013.01); *B29C 45/1756* (2013.01);
(Continued)

(58) Field of Classification Search
CPC ............ B29C 45/1756; B29C 45/2602; B29C 45/2673; B29C 45/2675; B29C 33/306
See application file for complete search history.

(56) References Cited

U.S. PATENT DOCUMENTS

| 4,174,939 A | 11/1979 | Fenner |
| 4,403,810 A | 9/1983 | Bieneck |
| 4,828,478 A | 5/1989 | Hehl |
| 5,249,947 A * | 10/1993 | Inaba ..................... B29C 33/72 425/150 |

(Continued)

FOREIGN PATENT DOCUMENTS

| DE | 2742166 C2 | 6/1980 |
| DE | 3000798 A1 | 7/1981 |

(Continued)

*Primary Examiner* — James P Mackey
(74) *Attorney, Agent, or Firm* — Harness, Dickey & Pierce, P.L.C.

(57) ABSTRACT

A molding die has a lower holder, an intermediate holder, an upper holder, a lock member, an upper link bar, a lower link bar, a restriction member, and a drive part. A movement of the lock member in a molding die opening direction or a molding die closing direction is restricted by the intermediate holder. The upper link bar has a first retaining groove in which the lock member fits when being located at a molding die closing position. The lower link bar has a second retaining groove in which the lock member fits and a release portion that enables the lock member to be released from the first retaining groove. The restriction member is movable between a restriction position that prevents the lock member from fitting in the second retaining groove and a free position that enables the lock member to fit in the second retaining groove.

4 Claims, 11 Drawing Sheets

(51) Int. Cl.
  *B29C 45/40* (2006.01)
  *B30B 11/00* (2006.01)
  *B29C 45/17* (2006.01)
  *B29C 45/84* (2006.01)
  *B29C 45/38* (2006.01)
  *B29C 45/67* (2006.01)

(52) U.S. Cl.
  CPC .......... *B29C 45/2673* (2013.01); *B29C 45/84* (2013.01); *B30B 11/007* (2013.01); *B29C 45/2602* (2013.01); *B29C 45/2675* (2013.01); *B29C 2045/388* (2013.01); *B29C 2045/4021* (2013.01); *B29C 2045/4026* (2013.01); *B29C 2045/6735* (2013.01)

(56) References Cited

U.S. PATENT DOCUMENTS

| | | | |
|---|---|---|---|
| 6,135,752 | A | 10/2000 | Enomoto et al. |
| 6,425,173 | B1 | 7/2002 | Enomoto et al. |
| 2003/0150586 | A1* | 8/2003 | Matsuura ............... B22D 17/22 164/137 |
| 2014/0175690 | A1* | 6/2014 | Sudermann ......... B29C 45/2673 264/39 |

FOREIGN PATENT DOCUMENTS

| | | |
|---|---|---|
| DE | 3644709 A1 | 7/1988 |
| DE | 69829158 T2 | 2/2006 |
| JP | H08197584 A | 8/1996 |
| JP | 2000117746 A | 4/2000 |
| JP | 2008119953 A | 5/2008 |

\* cited by examiner

MOLDING DIE AND DIE-EXCHANGING METHOD

CROSS REFERENCE TO RELATED APPLICATIONS

This application is a U.S. National Phase Application under 35 U.S.C. 371 of International Application No. PCT/JP2015/005647 filed on Nov. 12, 2015 and published in Japanese as WO 2016/075943 A1 on May 19, 2016. This application is based on and claims the benefit of priority from Japanese Patent Application No. 2014-230691 filed on Nov. 13, 2014. The entire disclosures of all of the above applications are incorporated herein by reference.

TECHNICAL FIELD

The present disclosure relates to a molding die and a die-exchanging method.

BACKGROUND ART

A three-plate molding die is known to be open at two positions of a position to take out a runner etc. and a position to take out a pinpoint gate type molded item when opening the molding die, for example, in an injection molding using resin (refer to Patent Literature 1 etc.).

Alternatively, a cassette type molding die is known to have a holder, as a case, that is attached mutually to a platen of a molding machine. A template provided with a cavity and a core corresponding to each molded item is mounted to the holder to be exchangeable. The cassette type molding die provides various molded items using the same molding machine.

PRIOR ART LITERATURES

Patent Literature

Patent Literature 1: JP 2008-119953 A

SUMMARY OF INVENTION

As a reference example, a vertical cassette type three-plate molding die that has a molding machine nozzle being in contact with the molding die from a ground side and injecting resin upward is considered. The three-plate molding die has three templates of a lower template, an intermediate template, and an upper template. The lower template, the intermediate template, and the upper template are respectively housed in a lower holder, an intermediate holder, and an upper holder.

According to the molding die of the reference example, a preparation for providing a molded item after molding a different molded item can be completed by exchanging only the templates while keeping the holder attached to a platen.

In an exchanging operation exchanging more than one template simultaneously, a exchanging jig having clicks is inserted under the template, which is released from the holder after a molding is completed, from a front side of the molding die. Then, the template located on the clicks of the exchanging jig is drawn frontward from the holder. Subsequently, another template used in a next molding is placed on the clicks of the exchanging jig, and the exchanging jig is inserted to the holder to dispose the another template in the holder.

A molding die opening amount between adjacent two templates in the exchanging operation is only required to be a distance that enables the clicks of the replacement jig to be inserted under the template. However, according to studies by the inventors of the present disclosure, a molding die opening mechanism of the three-plate molding die of the reference example cannot set a molding die opening amount in a molding operation and a molding die opening amount in the exchanging operation separately. Therefore, a molding die opening amount in the exchanging operation becomes equal to that in the molding operation at least between the lower template and the intermediate template. Accordingly, the intermediate template and the upper template are located high, and a center of gravity of the exchanging jig when the templates are located on the clicks is located high. As a result, safety and workability in the exchanging operation may deteriorate.

As a solution for the above-described abnormalities, an external operation mechanism dedicated for the exchanging operation may be provided such that the intermediate template and the upper template are lifted to a required height. However, an installation space is required, and a manufacturing cost may increase, in order to provide the operation mechanism having an output performance for raising the templates.

The present disclosure addresses the above issues, and it is an objective of the present disclosure to provide a molding die capable of improving workability in an exchanging operation for exchanging more than one template simultaneously and to provide a die-exchanging method using the same.

A molding die according to the present disclosure has a lower holder, an intermediate holder, and an upper holder that are stacked and configure a common case of the molding die and a lower template, an intermediate template, and an upper template that are disposed in the lower holder, the intermediate holder, and the upper holder, respectively, to be replaceable.

The molding die has a lock member, an upper link bar, a lower link bar, a restriction member, and a drive part. A movement of the lock member in a molding die opening direction or a molding die closing direction is restricted by the intermediate holder. The lock member is supported to be movable in a mold dividing surface direction.

The upper link bar is attached to the upper holder to protrude from the upper holder toward the intermediate holder. The upper link bar has a first retaining groove. The lock member fits in the first retaining groove when being located at a molding die closing position. The upper link bar fixes the intermediate holder and the upper holder to each other when the lock member fits in the first retaining groove. The lower link bar is attached to the lower holder to protrude from the lower holder toward the intermediate holder on a side opposite to the upper link bar with respect to the lock member. The lower link bar has a second retaining groove in which the lock member fits and a release portion that enables the lock member to be released from the first retaining groove when the lock member is located in the release portion. The lower link bar fixes the lower holder and the intermediate holder to be a specified first distance away from each other when the lock member fits in the second retaining groove. The lower link bar releases the upper holder and the intermediate holder from being fixed to each other when the lock member is located at the release portion.

The restriction member is movable between a restriction position that prevents the lock member from fitting in the second retaining groove and a free position that enables the lock member to fit in the second retaining groove. The drive part sets a position of the restriction member at the restriction position or the free position.

According to the molding die of the present disclosure, in a case of opening the molding die in a molding operation, the drive part moves the restriction member to the restriction position and prevents the lock member from fitting in the second groove when the lock member passes the second retaining groove. As a result, a molding die opening amount between the lower holder and the intermediate holder can be secured to be large.

On the other side, in an exchanging operation, a molding die opening amount between the lower holder and the intermediate holder is set to the first distance in a manner that the drive part moves the restriction member to the free position and that the lock member is enabled to fit in the second retaining groove. The first distance is set to a minimal distance, for example, that enables clicks (i.e., support members), which are provided with an exchanging jig and capable of supporting the templates, to be inserted between the lower holder and the intermediate holder.

Accordingly, a molding die opening amount in a molding operation and a molding die opening amount in an exchanging operation can be set separately. As a result, a center of gravity of the exchanging jig on a condition that the templates are located on the clicks is located low, and thereby safety and workability in a templates simultaneous exchanging operation can be improved. In addition, time duration required for the exchanging operation can be shortened by performing the exchanging operation efficiently.

Furthermore, a drive force of the drive part required to set the position of the restriction member is very small, and thereby an installation space and a manufacturing cost can be reduced as compared to a case of disposing an operation mechanism for lifting the templates.

A die-exchanging method according to the present disclosure for the above-described molding die exchanges more than one template of the lower template, the intermediate template, and the upper template simultaneously. The die-exchanging method includes the following processes (I) through (IV).

(I) Lifting the intermediate holder and the upper holder, on a condition of being fixed to each other, integrally from the molding die closing position while the lock member fits in the first retaining groove.

(II) Fixing the lower holder and the intermediate holder to be the first distance away from each other in a manner that the restriction member is located at the restriction position and that the lock member is released from the first retaining groove and fits in the second retaining groove by lifting the intermediate holder in the molding die opening direction.

(III) Moving the upper holder in the molding die opening direction such that the intermediate holder and the upper holder are a specified second distance (h2) away from each other.

(IV) Exchanging the more than one template simultaneously using an exchanging jig that has support portions capable of supporting the more than one template simultaneously.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

A molding die according to an embodiment of the present disclosure will be described hereafter referring to drawings.

Figure 1:
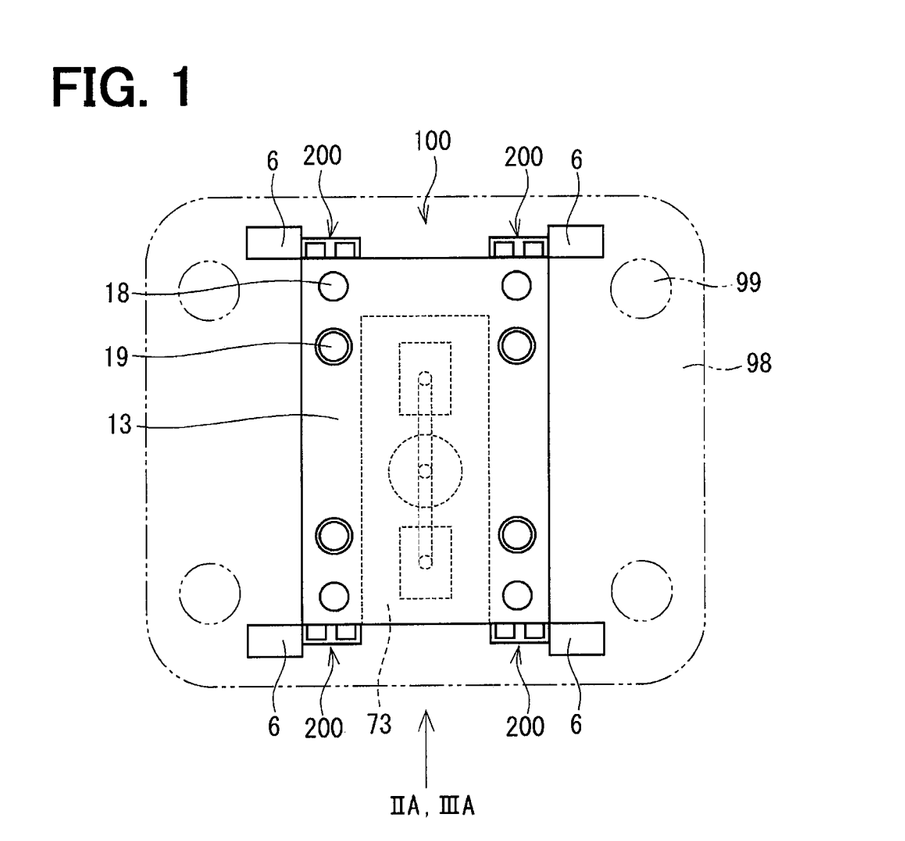
FIG. 1 is a plan view illustrating a molding die according to an embodiment of the present disclosure.
Figure 2A:
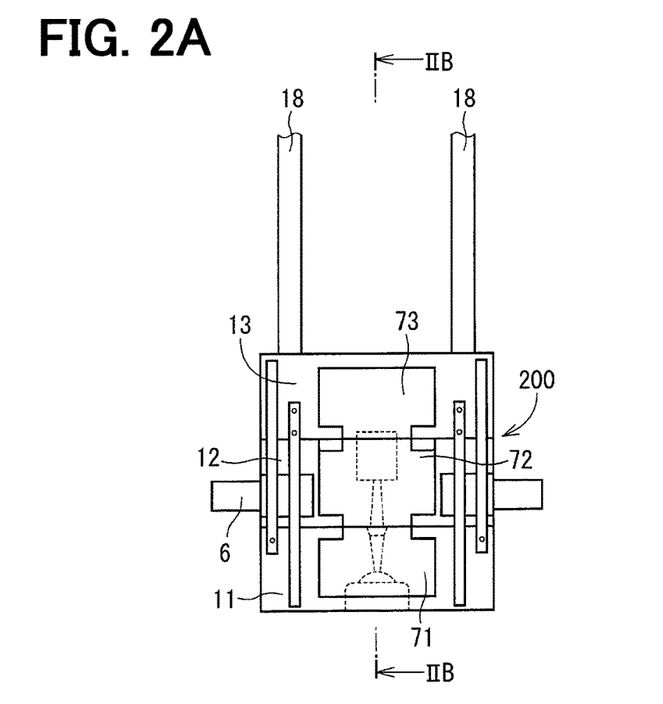
FIG. 2A is a front view illustrating the molding die in FIG. 1 in a closed state.
Figure 2B:
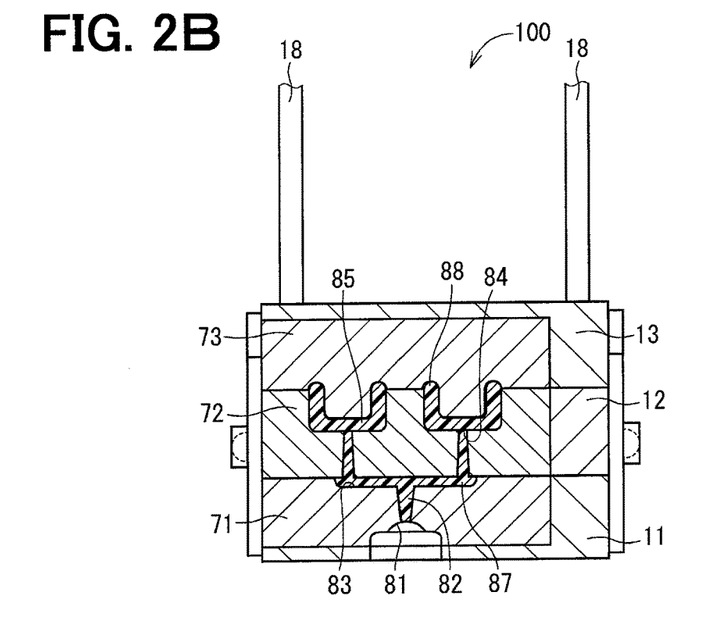
FIG. 2B is a sectional view illustrating the molding die in FIG. 1 in the closed state along a template mounting direction.
Figure 3A:
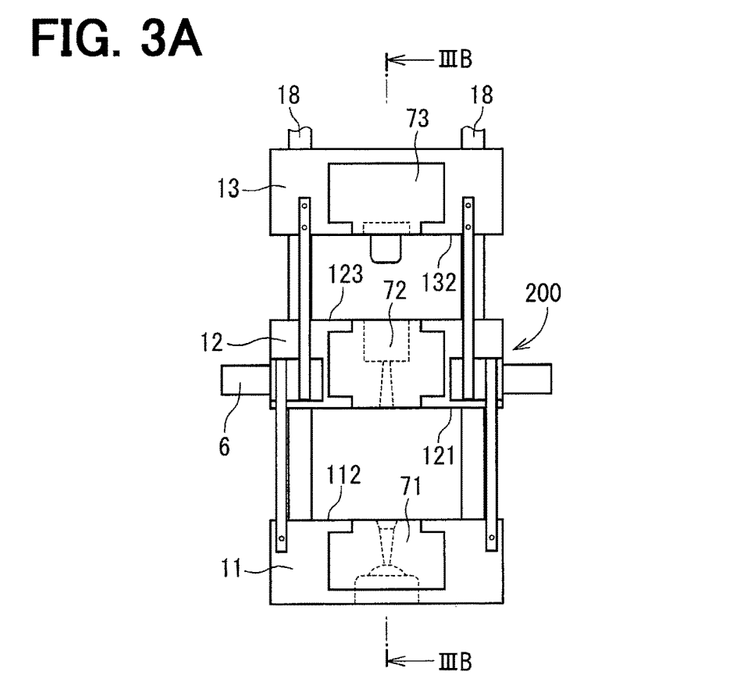
FIG. 3A is a front view illustrating the molding die in FIG. 1 in an open state.
Figure 3B:
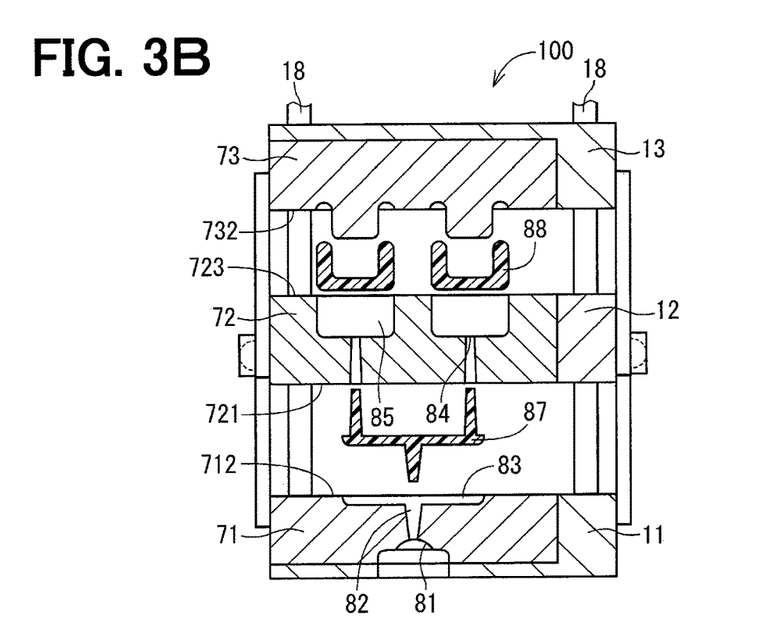
FIG. 3B is a sectional view illustrating the molding die in FIG. 1 in the open state along the template mounting direction.

First, an overall configuration of a molding die will be described referring to schematic diagrams shown in FIG. 1 through FIG. 3. FIG. 1 is a plan view illustrating the molding die when viewed from above in a vertical direction (i.e., up-down direction). FIG. 2A and FIG. 3A are front views when viewed from a worker's side, FIGS. 2B and 3B are sectional views taken along a plane passing through a center of the molding die. In FIG. 2A through FIG. 3B, a sheet upper side corresponds to an upper side (i.e., top side) in the up-down direction and a sheet lower side corresponds to a lower side (i.e., ground side). In other words, a molding die 100 of the present embodiment is mounted to a vertical injection molding machine and is open and closed in the vertical direction. In FIG. 1, a platen 98 and tie bars 99 of the injection molding machine are shown by two-dot chain lines.

General structures such as a positioning structure, an ejecting mechanism, and a die temperature control structure are not shown in the drawings.

The molding die 100 is a three-plate molding die to which a pinpoint gate method is applied.

FIG. 2A and FIG. 2B shows a closed state of the molding die. In the closed state, a molten resin is injected from an injection molding machine nozzle (not shown) through a nozzle touch portion 81 is filled into a cavity 85 via a sprue 82, a runner groove 83, and pinpoint gates 84, and is cooled and cured.

FIG. 3A and FIG. 3B shows an open state of the molding die. In the open state, the molding die 100 is opened at two die division planes, and a runner 87 and a molded item 88 are taken out from spaces respectively.

The structure of the molding die 100 will be described in order. The molding die 100 is configured as "a cassette type molding die" that has a holder, as a case, attached mutually to a platen 98 of a molding machine. A template provided with a cavity and a core corresponding to each molded item is mounted to the holder to be exchangeable. Therefore, only the template is required to be exchanged and is easily exchanged in a case of molding various molded items using the same molding machine.

The molding die 100 includes a lower holder 11, an intermediate holder 12, an upper holder 13, the lower holder 11, a lower template 71, an intermediate template 72, and an upper template 73. The intermediate holder 12 and the upper holder 13 are stacked and configure a mutual case of the cassette type molding die. The lower template 71, the intermediate template 72, and the upper template 73 are respectively mounted to the lower holder 11, the intermediate holder 12, and the upper holder 13 in the replaceable manners. The three holders 11, 12, and 13 are collectively referred to as a holder unit 10, and the three templates 71, 72, and 73 are collectively referred to as a template unit 70.

The holders 11, 12, 13 provide a housing space that is open on a front side and closed on a back side. The templates 71, 72, and 73 can be mounted to the holders 11, 12, and 13 by being inserted into the holders 11, 12, and 13 from the front side toward the back side.

The lower template 71 is attached to a fixed platen of the molding machine and has the nozzle touch portion 81, the sprue 82, and the runner groove 83. The intermediate template 72 has the pinpoint gates 84 and the cavities 85. The upper template 73 is attached to a movable platen of the molding machine and has cores.

More than one (e.g., four) of guide pin 18 is inserted through the three holders 11, 12, and 13. In the present embodiment, linkages 200 are provided to four positions, i.e., left and right positions on the front side and left and right positions on the back side of the holders 11, 12, and 13. The upper holder 13 is attached to the movable platen. The intermediate holder 12 is connected with the lower holder 11 and the upper holder 13 through the linkages 200. Accordingly, the intermediate holder 12 and the upper holder 13 are lifted or lowered along the guide pin 18 when the movable platen of the molding machine is lifted or lowered, and thereby the templates 71, 72, 73 are opened or closed. A molding die opening limit of the upper holder 13 is set using a molding die opening restriction pin 19 (refer to FIG. 1) that has a lock flange at an end portion. An illustration of a detail structure of the molding die opening restriction pin 19 is omitted since the structure is well-known.

A structure for disposing the templates 71, 72, 73 in the holders 11, 12, 13 respectively, and a "templates simultaneous exchanging operation" for simultaneously exchanging three templates 71, 72, 73 respectively disposed in the holders 11, 12, 13 will be described hereafter referring to FIG. 4 through FIG. 6.

Figure 4:
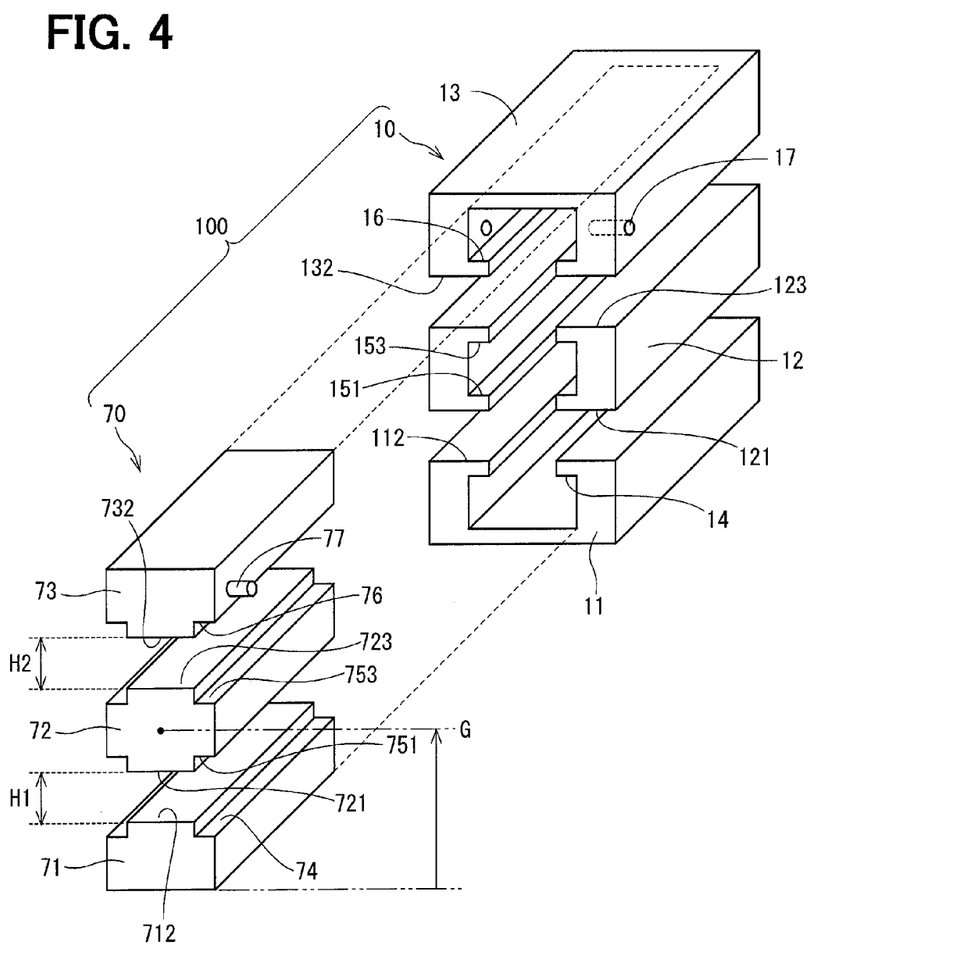
FIG. 4 is a perspective view illustrating molding die opening amounts of the molding die in molding.
Figure 5:
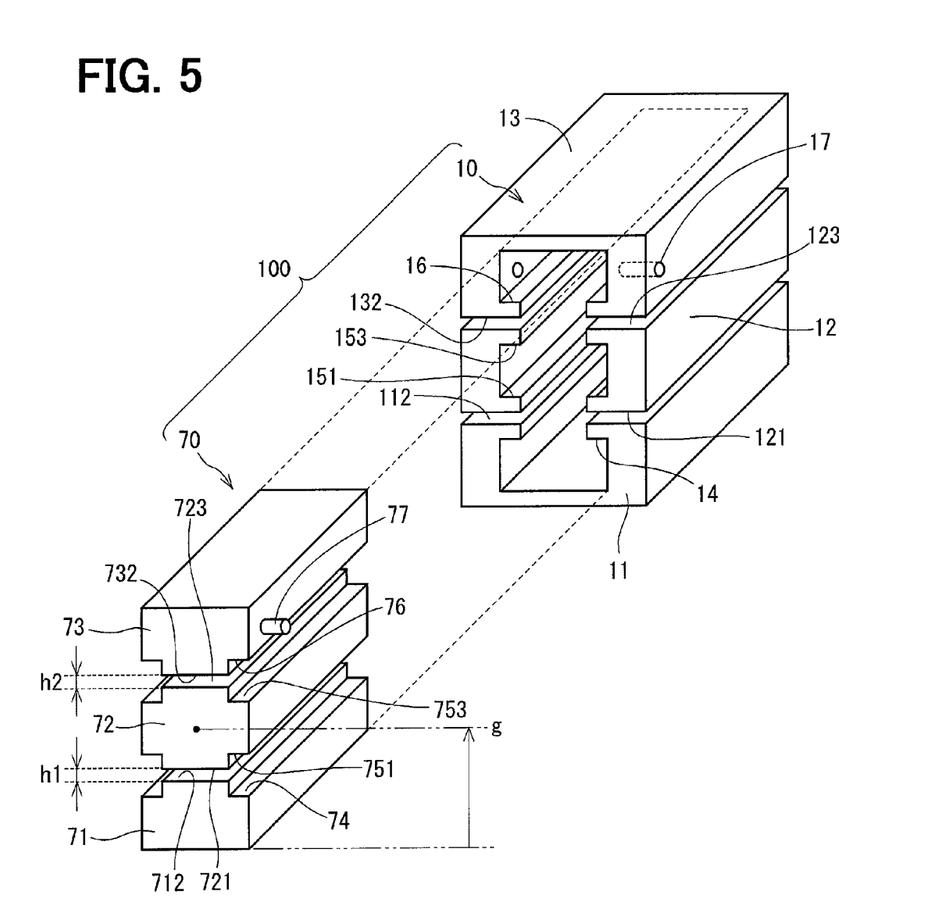
FIG. 5 is a perspective view illustrating molding die opening amounts of the mold in an exchanging operation.

As shown in FIG. 4 and FIG. 5, the lower holder 11 has a groove. The groove is open in an upper surface 112 of the lower holder 11, and an opening width of the groove is smaller than a width of the housing space provided in the lower holder 11. The lower template 71 has an upper surface 712, and the upper surface 712 has a side edge provided with a stepped portion 74. The lower holder 11 has a rail 14 that guides the stepped portion 74 when the lower template 71 is disposed in the lower holder 11.

The intermediate holder 12 has a lower surface 121 and an upper surface 123 provided with openings respectively. An opening width of each of the openings is smaller than a width of the housing space provided in the intermediate holder 12. The intermediate template 72 has a lower surface 721 and an upper surface 723 that respectively have side edges provided with a stepped portion 751 and a stepped portion 753 respectively. The intermediate holder 12 has a rail 151 and a rail 153 that guide the stepped portion 751 and the stepped portion 753 respectively when the intermediate template 72 is disposed in the intermediate holder 12.

The upper holder 13 has a groove. The groove is open in a lower surface 132 of the upper holder 13, and an opening width of the groove is smaller than a width of the housing space provided in the upper holder 13. The upper template 73 has a lower surface 732, and the lower surface 732 has a side edge provided with a stepped portion 76. The upper holder 13 has a rail 16 that guides the stepped portion 76 when the upper template 73 is disposed in the upper holder 13.

Reference surfaces 712, 721, 723, 731 of the templates 71, 72, 73 are located at levels substantially coincide with levels of reference surfaces 112, 121, 123, 131 of the holders 11, 12, 13 respectively, on a condition that the templates 71, 72, 73 are disposed in the holders 11, 12, 13. Specifically, positions of the reference surfaces 712, 721, 723, 731 of the templates are designed, such that surfaces of adjacent two of the templates 71, 72, and 73 are certainly in contact with each other when the molding die is clamped, and that a leakage of resin and a burr in the surfaces are suppressed.

In FIG. 4 and FIG. 5, a protruding pin 77 and a lock hole 17 are representatively illustrated only in the upper template 73 and the upper holder 13 respectively. For example, the protruding pin 77 is embedded in an outer wall of the upper template 73 before the upper template 73 is disposed in the upper holder 13. The protruding pin 77 protrudes from the outer wall and is inserted to the lock hole 17 when the upper template 73 is disposed in the upper holder 13. As a result, the upper template 73 is locked not to be drawn from the upper holder 13. Similarly, the lower template 71 and the lower holder 11 are caught together, and the intermediate template 72 and the intermediate holder 12 are caught together.

According to the cassette type molding die, only the three templates 71, 72, 73 are exchanged while the holders 11, 12, 13 are kept to be attached to the platen of the molding machine to shift from a production of one molded item to a production of another molded item. The above-described work exchanging the templates 71, 72, 73 will be hereafter referred to as an "exchanging operation". Especially, the above-described work will be hereafter referred to as a "templates simultaneous exchanging operation" when more than one of the templates 71, 72, 73 is exchanged simultaneously. The following descriptions are based on an assumption that three of the templates 71, 72, 73 are exchanged simultaneously.

Here, a distance H1 between the lower template 71 and the intermediate template 72 and a distance H2 between the intermediate template 72 and the upper template 73 shown in FIG. 4 correspond to a molding die opening amount in a molding operation. According to a molding die, as in the reference example, that cannot set the molding die opening amount in the molding operation and a molding die opening amount in the exchanging operation separately, the templates simultaneous exchanging operation is performed on a condition that the molding die opening amount in the molding operation and the molding die opening amount in the exchanging operation are equal to each other at least regarding the distance H1 between the lower template 71 and the intermediate template 72. In this case, a center G of gravity of the three templates 71, 72, 73 is located relatively high. Accordingly, safety and workability in the exchanging operation may deteriorate.

Then, the molding die 100 according to the present embodiment is designed to be capable of setting the molding die opening amounts in the molding operation and the molding die opening amounts in the exchanging operation separately, and thereby the molding die opening amount in the exchanging operation is set to a minimal amount. That is, as shown in FIG. 5, a distance h1 between the lower template 71 and the intermediate template 72 and a distance h2 between the intermediate template 72 and the upper template 73 in the templates simultaneous exchanging operation are set smaller than the distance H1 and the distance H1 (refer to FIG. 4), corresponding to the molding die opening amount in the molding operation, respectively, according to the present embodiment. The distance h1 and the distance h2 correspond to the "first distance" and the "second distance" respectively. In this way, a center g of gravity of the three templates 71, 72, and 73 is located below the center G of gravity shown in FIG. 4.

Figure 6:
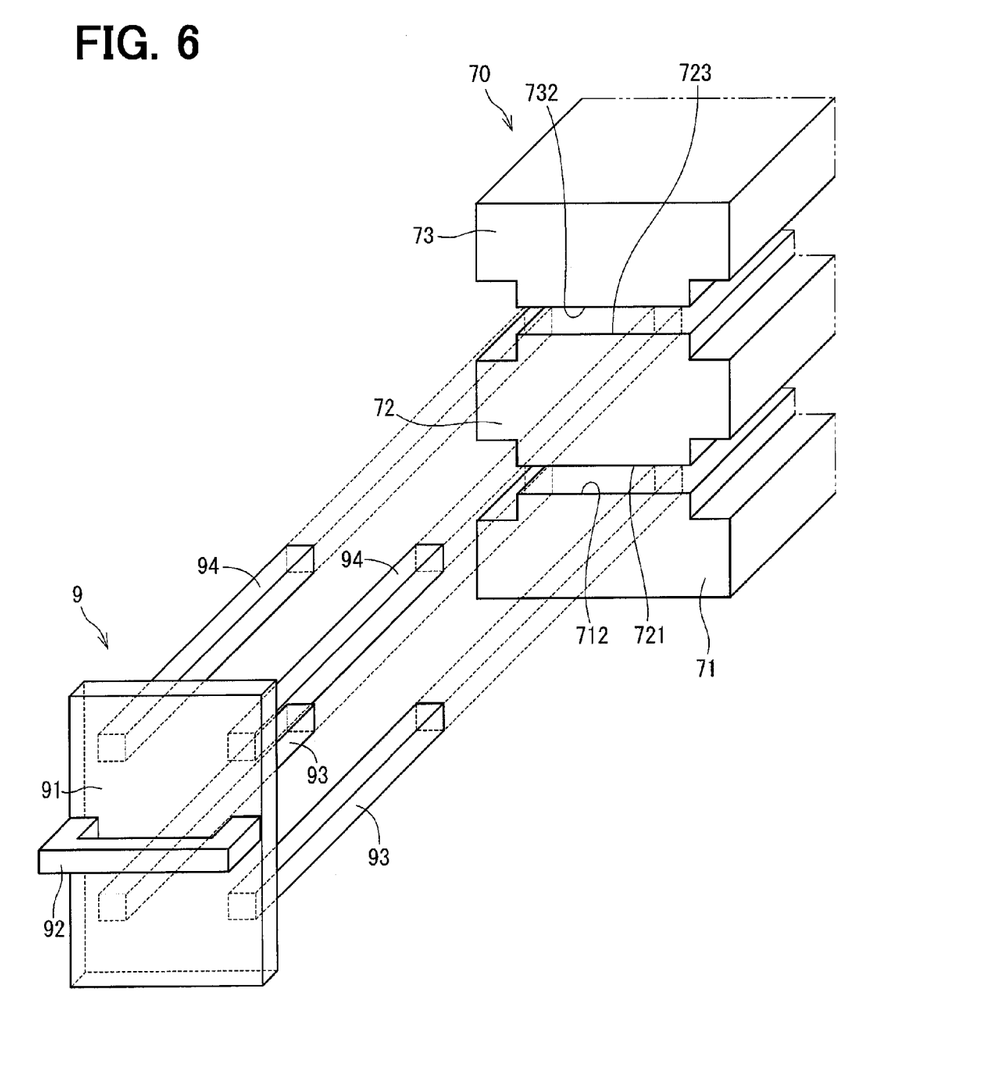
FIG. 6 is a perspective view for explaining a die-exchanging method by use of a exchanging jig.

An exchanging jig used for the templates simultaneous exchanging operation in the present embodiment is shown in FIG. 6. An exchanging jig 9 has a main plate 91 provided with a handle 92 and clicks 93, 94. The handle 92 is located on a front side of the main plate 91, and the clicks 93, 94 protrude from the main plate 91 on a back side. The click 93 is capable of supporting the intermediate template 72 when being interposed between the upper surface 712 of the lower template 71 and the lower surface 721 of the intermediate template 72. The click 94 is capable of supporting the upper template 73 when being interposed between the upper surface 723 of the intermediate template 72 and the lower surface 731 of the upper template 73. An illustration of a portion that supports the lower template 71 is omitted.

According to the templates simultaneous exchanging operation of the present embodiment, the distance between the lower template 71 and the intermediate template 72 and the distance between the intermediate template 72 and the upper template 73 are only required to be a distance that enables the clicks 93, 94 of the exchanging jig 9 to be inserted between the lower template 71 and the intermediate template 72 and the distance between the intermediate template 72 and the upper template 73, and are not required to be larger than the distance.

In the templates simultaneous exchanging operation, a worker releases the templates 71, 72, 73 and the holders 11, 12, 13 from being caught together, and inserts the clicks 93, 94 of the exchanging jig 9 to the molding die 100 on a condition that the molding die 100 is open at a distance of the distances h1, h2 corresponding to the molding die opening amount in the exchanging operation. Three of the templates 71, 72, 73 can be taken out simultaneously by drawing the exchanging jig 9 using the handle 92 on a condition that the templates 71, 72, 73 are supported. Subsequently, the templates 71, 72, 73 used in next molding are placed on the exchanging jig 9 and disposed in the holders 11, 12, 13 respectively, and then the protruding pin 77 provided in each of the templates 71, 72, 73 and the lock hole 17 provided in each of the holders 11, 12, 13 are caught together after.

The above-described exchanging operation can be performed on a condition that the center g of gravity of the exchanging jig 9 is located low, and therefore safety and workability can be improved.

Figure 7:
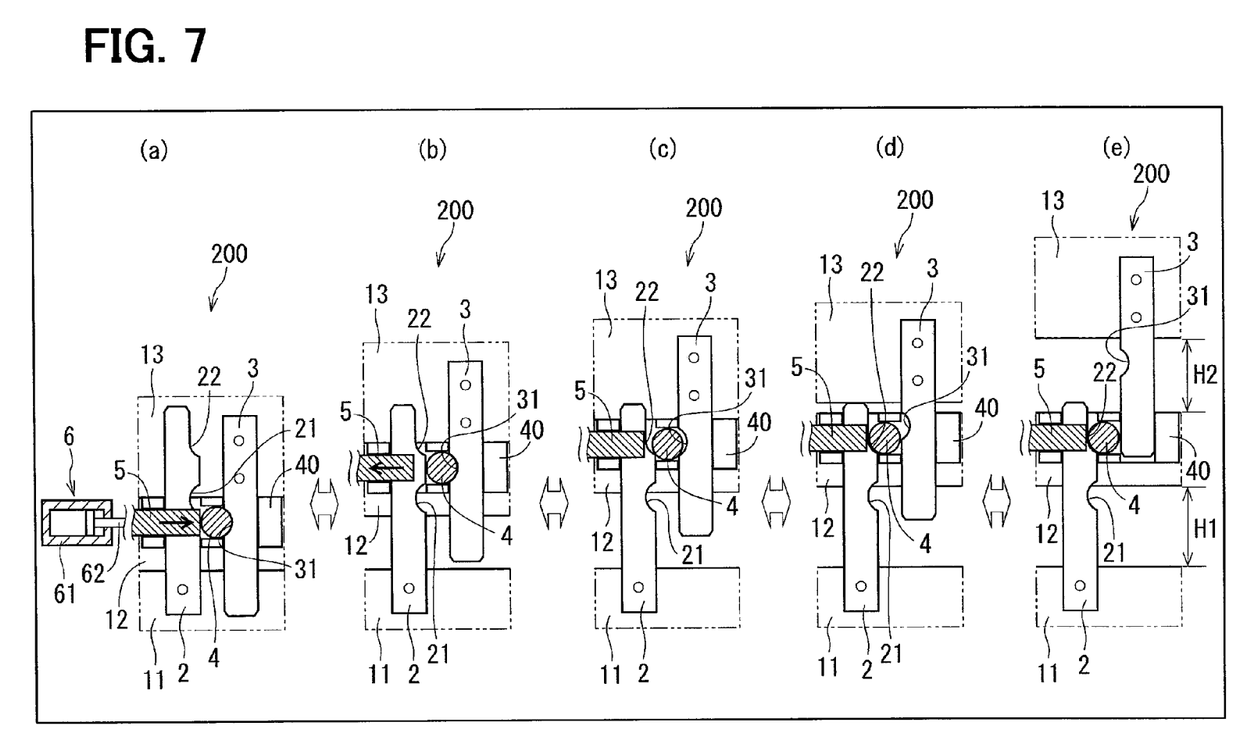
FIG. 7 is a schematic diagram illustrating molding die opening and closing operations of the molding die in the molding operation.
Figure 8:
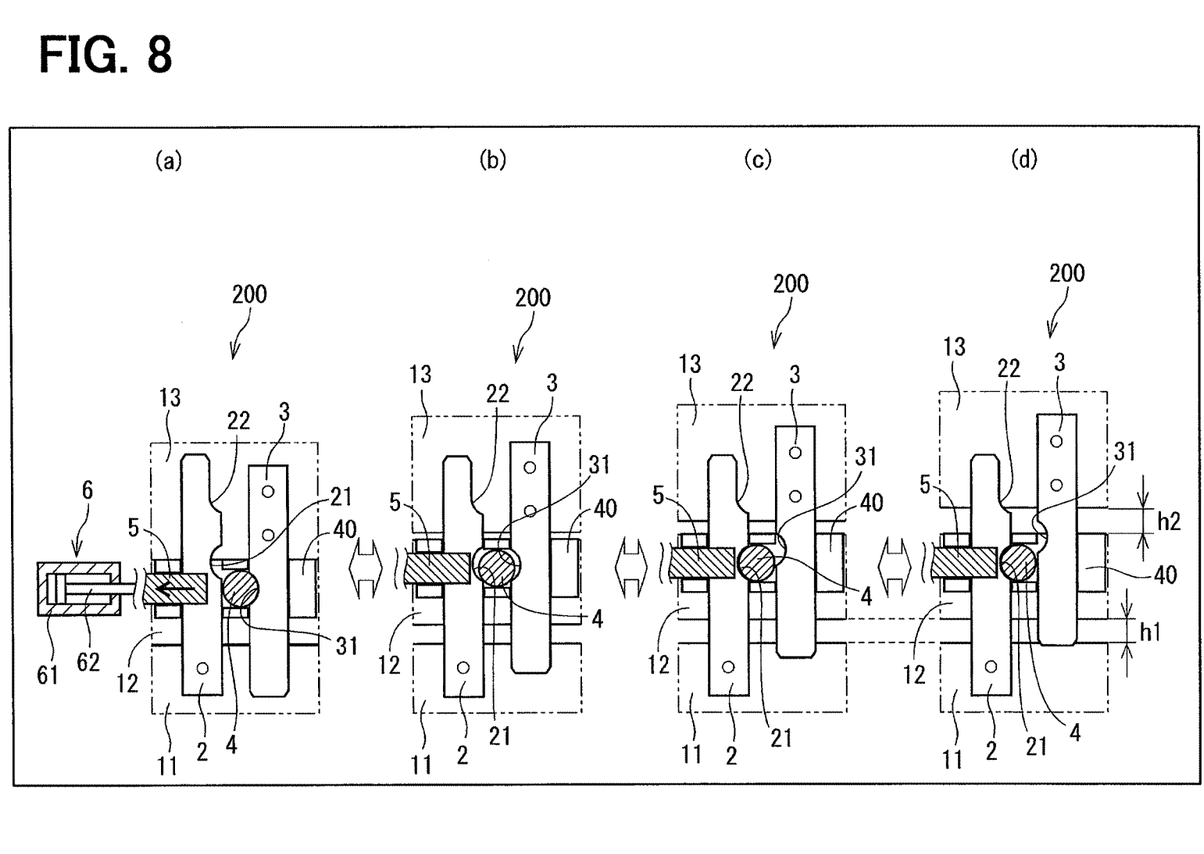
FIG. 8 is a schematic diagram illustrating molding die opening and closing operations of the molding die in the exchanging operation.
Figure 9:
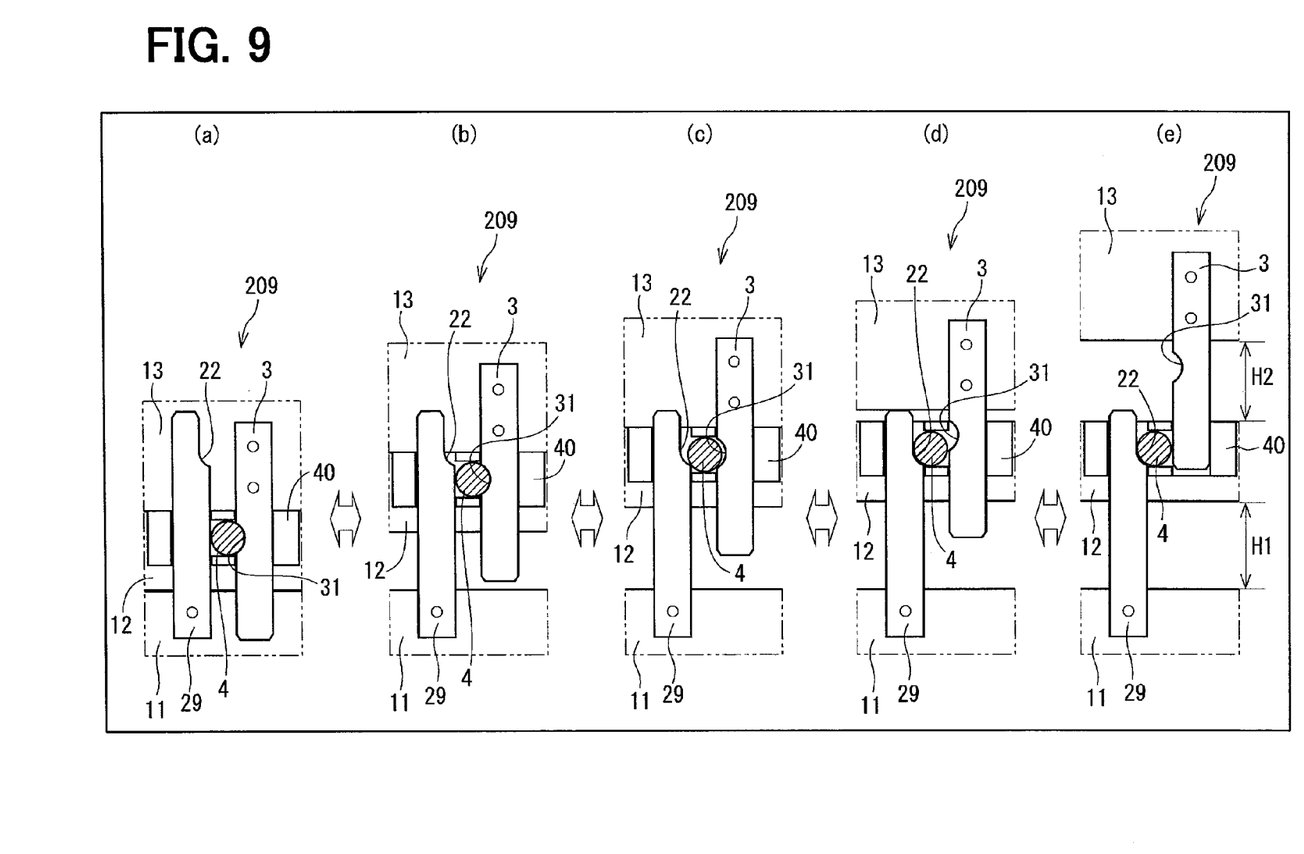
FIG. 9 is a schematic diagram illustrating molding die opening and closing operations of a molding die according to a reference example in molding.
Figure 10:
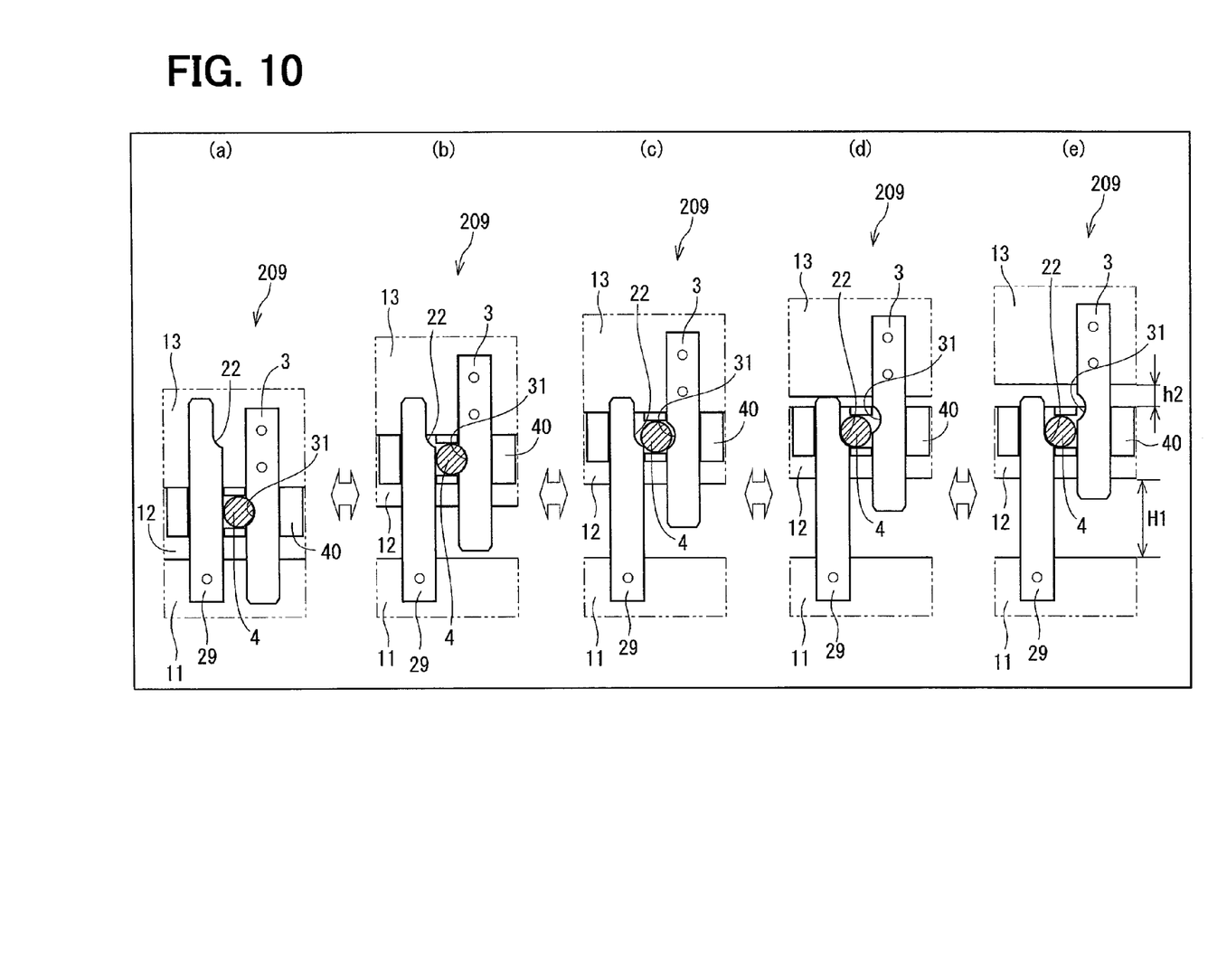
FIG. 10 is a schematic diagram illustrating molding die opening and closing operations of the molding die according to the reference example in an exchanging operation.

A configuration of linkages 200 will be described hereafter referring to FIG. 7 through FIG. 10 with the reference example. The linkages 200 is provided across the holders 11, 12, 13 and enables the molding die opening amount in the molding operation the molding die opening amount in the exchanging operation to be set separately. FIG. 7 and FIG. 8 show a molding die opening/closing operation of the molding die performed by the linkages 200 in the molding operation and the exchanging operation according to the present embodiment. FIG. 9 and FIG. 10 show a molding die opening/closing operation of the molding die performed by linkages 209 in the molding operation and the exchanging operation according to the reference example. A position shown in (a) of FIG. 7 through FIG. 10 is a molding die closing position, and the molding die gradually opens in order of states (b), (c), (d), and (e).

Hatching provided to a lock pin 4 (FIG. 7 through FIG. 10) and a slider 5 (FIG. 7 and FIG. 8) is for distinguishing the lock pin 4 and the slider 5 from surrounding members and does not show sections.

The linkages 209 according to the reference example will be described first referring to FIG. 9 and FIG. 10. The linkages 209 have a lower link bar 29 attached to the lower holder 11, an upper link bar 3 attached to the upper holder 13, a lock pin guide 40 attached to the intermediate holder 12, and the lock pin 4 supported by the lock pin guide 40. Circles shown with the lower link bar 29 and the upper link bar 3 are head portions of bolts fastening the lower link bar 29 and the lower holder 11 to each other, and the upper link bar 3 and the upper holder 13 to each other.

The lock pin 4 is supported by the lock pin guide 40 in the intermediate holder 12, such that the lock pin 4 is prevented from moving in a molding die opening direction or a molding die closing direction (i.e., an up-down direction in FIG. 9 and FIG. 10) and is capable of moving in a molding die dividing surface direction (i.e., a left-right direction in FIG. 9 and FIG. 10). The lock pin 4 in the present embodiment has a circular column shape.

The upper link bar 3 is attached to the upper holder 13 so as to protrude from the upper holder 13 toward the intermediate holder 12. The lower link bar 29 is attached to the lower holder 11 to protrude from the lower holder 11 toward the intermediate holder 12 and to face the upper link bar 3 on a side opposite to the upper link bar 3 with respect to the lock pin 4.

A side of the upper link bar 3 adjacent to the lock pin 4 and a side of the lower link bar 29 adjacent to the lock pin 4 will be referred to as an "inner side" hereafter for convenience. The upper link bar 3 has a first retaining groove 31 in a middle portion on the inner side. The first retaining groove 31 has an arc shape and is capable of fitting the lock pin 4 in the molding die closing position. The lower link bar 29 has a release portion 22 in an upper portion on the inner side. The release portion 22 has a shape provided by extending an arc-shaped groove until the arc-shaped groove is opened at an upper end.

In the molding operation shown in FIG. 9, the lock pin 4 fits in the first retaining groove 31 at the molding die closing position shown in (a), and thereby the intermediate holder 12 and the upper holder 13 are fixed. The intermediate holder 12 and the upper holder 13 lift integrally with each other as shown in (b) and (c). The intermediate holder 12 and the upper holder 13 are released from being fixed as shown in (c) and (d) when the lock pin 4 fitting in the first retaining groove 31 comes into the release portion 22 due to gravity force and is released from the first retaining groove 31. Subsequently, the upper holder 13 independently starts lifting from a position shown in (d) and reaches the molding die opening limit at a position shown in (e). A distance between the lower holder 11 and the intermediate holder 12 and a distance between the intermediate holder 12 and the upper holder 13 at this time respectively correspond to the distance H1 and the distance H2 shown in FIG. 4.

In the exchanging operation shown in FIG. 10, operations shown in (a) through (c) are the same as those in the molding operation. Accordingly, the distance H1 between the lower holder 11 and the intermediate holder 12 inevitably becomes equal to that in the molding operation. Then, at a position shown in (e), a distance between the intermediate holder 12 and the upper holder 13 can be set to the distance h2 that is smaller than the distance H2 by adjusting a travel distance of the movable platen of the molding machine to be relatively short. However, a center of gravity in the templates simultaneously exchanging operation is located relatively high, and thereby safety and workability may deteriorate, since the distance H1 between the lower older 11 and the intermediate holder 12 is the same as that in the molding operation.

The linkages 200 according to the present embodiment will be described hereafter referring to FIG. 7 and FIG. 8. The linkages 200 according to the present embodiment have a different portion in a configuration of a lower link bar 2 as compared to the linkages 209 according to the reference example. Specifically, the linkages 200 further have the slider 5 as a restriction member and a drive part 6. The same component substantially the same as that of the linkages 209 of the reference example is thereby assigned with the same reference number, and an explanation is omitted.

The lower link bar 2 has a second retaining groove 21, in addition to the release portion 22, in a middle portion on the inner side. The second retaining groove 21 has an arc shape and is capable of fitting to the lock pin 4 as a "lock member". The slider 5 is capable of moving between a "restriction position" that prevents the lock pin 4 from fitting in the second retaining groove 21 and a "free position" that enables the lock pin 4 to fit in the second retaining groove 21. The slider 5 according to the present embodiment presses the lock pin 4 against the upper link bar 3 from a side adjacent to the lower link bar 2 when being located at the restriction position.

According to the present embodiment, a tip of the slider 5 in a moving direction in which the slider 5 moves is located on a surface of the lower link bar 2 facing the upper link bar 3, when the slider (i.e., a restriction member) 5 is located at the restriction position. Specifically, a position of the slider 5 shown in (a) of FIG. 7 corresponds to the restriction position. However, the location of the tip of the slider 5 at the restriction position is not limited to be on the surface of the lower link bar 2 as long as the lock pin (i.e., a lock member) 4 can be prevented from fitting in the second retaining groove 21. For example, when viewed from the moving direction of the slider 5, the slider 5 may cover a most part (e.g., more than half) of the second retaining groove 21 in the restriction position. Alternatively, the slider 5 may protrude from the surface of the lower link bar 2 toward the upper link bar 3 at the restriction position.

According to the present embodiment, the slider 5 is located at a position in the lower link bar 2 not to cover the second retaining groove 21 when the slider 5 is located at the free position. In other words, a deepest portion of the second retaining groove 21 is located between the tip of the slider 5 and the surface of the lower link bar 2 facing the upper link bar 3, when the slider 5 is located at the free position. Specifically, positions of the slider 5 shown in (b) through (e) of FIG. 7 and (a) through (d) of FIG. 8 correspond to the free position. However, the slider 5 may cover a small part of the second retaining groove 21 in the free position, as long as the slider 5 enables the lock pin (i.e., the lock member) 4 to fit in the second retaining groove 21. For example, the slider 5 may cover a part (e.g., less than half) of the second retaining groove 21 in the free position, when viewed from the moving direction of the slider 5.

As shown in FIG. 1 through FIG. 3, the drive part 6 is attached to protrude from both sides of the intermediate holder 12 in the left-right direction when viewed from the front side of the molding die 100. The drive part 6 has a body 61 and a rod 62. The slider 5 is attached to a tip of the rod 62. The rod 62 moves frontward or backward when an air pressure is applied to the body 61, and thereby the slider 5 moves between the restriction position and the free position. The drive part 6 is, for example, an air cylinder.

In the molding operation shown in FIG. 7, the lock pin 4 fits in the first retaining groove 31 at the molding die closing position shown (a), and thereby the intermediate holder 12 and the upper holder 13 are fixed. The drive part 6 moves the slider 5 frontward to be located at the restriction position and to close a part of the second retaining groove 21, such that the lock pin 4 is prevented from fitting in the second retaining groove 21.

The lock pin 4 does not have a chance to fit in the second retaining groove 21 when the intermediate holder 12 and the upper holder 13 lift integrally to a position shown in (b) passing through the second retaining groove 21 on a condition that the slider 5 is located at the restriction position. Therefore, the drive part 6 moves the slider 5 backward to the free position. Operations shown in (c), (d), (e) of FIG. 7 are similar to those of the linkage 209 in the reference example shown in FIG. 9. The distance between the lower holder 11 and the intermediate holder 12 is H1, and the distance between the intermediate holder 12 and the upper holder 13 is H2, at the molding die opening limit shown in (e) of FIG. 7.

On the other hand, similar to the operation in the molding operation, the lock pin 4 fits in the first retaining groove 31 at the molding die closing position shown in (a), and thereby the intermediate holder 12 and the upper holder 13 are fixed in the exchanging operation shown in FIG. 8. However, the drive part 6 moves the slider 5 to the free position as different as in the exchanging operation from in the molding operation. That is, the lock pin 4 is enabled to fit in the second retaining groove 21.

As shown in FIG. 8, the lock pin 4 starts fitting in the second retaining groove 21 due to gravity force at the position shown in (b), and completely fits in the second retaining groove 21 at the position shown in (c), when the intermediate holder 12 and the upper holder 13 integrally lift and when the lock pin 4 reaches the same level as the second retaining groove 21. The lower holder 11 and the intermediate holder 12 are fixed on a condition of having a specified "first distance h1" therebetween when the lock pin 4 fits in the second retaining groove 21. The first distance h1 is set to a minimal distance, for example, that enables a lower click 93 of the exchanging jig 9 shown in FIG. 6 to be inserted between the lower holder 11 and the intermediate holder 12.

Subsequently, at the position shown in (d) of FIG. 8, a distance between the intermediate holder 12 and the upper holder 13 can be set to a "second distance h2" that is smaller than the distance H2 by adjusting a travel distance of the movable platen of the molding machine to be relatively short. The second distance h2 is set to a minimal distance, for example, that enables an upper click 94 of the exchanging jig 9 shown in FIG. 6 to be inserted between the intermediate holder 12 and the upper holder 13.

As described above, the molding die 100 according to the present embodiment uses, as the linkages 200, the lower link bar 2 provided with the second retaining groove 21, and sets the molding die opening amounts in the molding operation and in the exchanging operation separately by moving the slider 5 between the restriction position and the free position by the drive part 6. That is, the slider 5 is located at the restriction position to prevent the lock pin 4 from fitting in the second retaining groove 21 in the molding operation, and the slider 5 is located at the free position to enables the lock pin 4 to fit in the second retaining groove 21 in the exchanging operation.

Accordingly, both the distance between the lower holder 11 and the intermediate holder 12 and the distance between the intermediate holder 12 and the upper holder 13 in the exchanging operation can be respectively set to the first distance h1 and the second distance h2 that are respectively smaller than the distance H1 and the distance H2 corresponding to the molding die opening amounts in the molding operation. Therefore, the center of gravity in the templates simultaneous exchanging operation can be located low, and safety and workability can be improved.

As the configuration for switching between the molding die opening amount in the molding operation and the molding die opening amount in the exchanging operation, an external operation mechanism specialized for the exchanging operation may be provided to lift the intermediate template 72 and the upper template 73 to a required height during the exchanging operation. However, an installation space is required, and a manufacturing cost may increase, in order to provide the external operation mechanism having an output performance for lifting the templates.

In contrast, according to the present embodiment, a drive force of the drive part 6 for moving the slider 5 is very small. The installation space and the manufacturing cost thereby can be reduced as compared to a case providing an operation mechanism for lifting the templates.

(Die-Exchanging Method)

The templates simultaneous exchanging operation according to the present embodiment is a die-exchanging method for simultaneously exchanging more than one of the lower template 71, the intermediate template 72, and the upper template 73 in the molding die 100. The die-exchanging method includes the following processes (I) to (IV).

(I) Lifting the intermediate holder 12 and the upper holder 13, on a condition of being fixed to each other, integrally from the molding die closing position while the lock pin 4 fits in the first retaining groove 31 provided in the upper link bar 3 (FIG. 8 (a)).

(II) Fixing the lower holder 11 and the intermediate holder 12 to be the first distance h1 away from each other in a manner that the lock pin 4 is released from the first retaining groove 31 and fits in the second retaining groove 21 by lifting the intermediate holder 12 (FIG. 8 (b), (c)).

(III) Moving the upper holder 13 in a molding die opening direction such that the intermediate holder 12 and the upper holder 13 are the specified second distance h2 away from each other (FIG. 8 (d)).

(IV) Exchanging more than one template of the three templates 71, 72, 73 simultaneously using the exchanging jig 9 that has support portions capable of supporting the more than one template simultaneously. According to the present embodiment, the templates 71, 72, 73 are exchanged with respect to the corresponding holders 11, 12, 13 by using the exchanging jig 9 that has the clacks (i.e., the support portions) 93, 94 capable of supporting the three templates 71, 72, 73 simultaneously.

Thus, according to the present embodiment, the molding die 100 is open by performing the above-described processes using the exchanging jig 9 shown in FIG. 6, and therefore the templates simultaneous exchanging operation can be performed safety and effectively on a condition that the center of gravity is located low. Thus, time duration required for the exchanging operation when molding different molded items using the same molding machine can be shortened, and productivity can be improved.

In the molding operation, a space for removing the runner 87 and the molded items 88 can be secured appropriately in a manner that the drive part 6 is prevented from moving frontward or backward depending on a molding die opening stroke and that the lock pin 4 is prevented from fitting in the second retaining groove 21 (FIG. 7).

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The present disclosure is intended to cover various modifications and equivalent arrangements within the scope of the present disclosure.

(Other Modifications)

Figure 11:
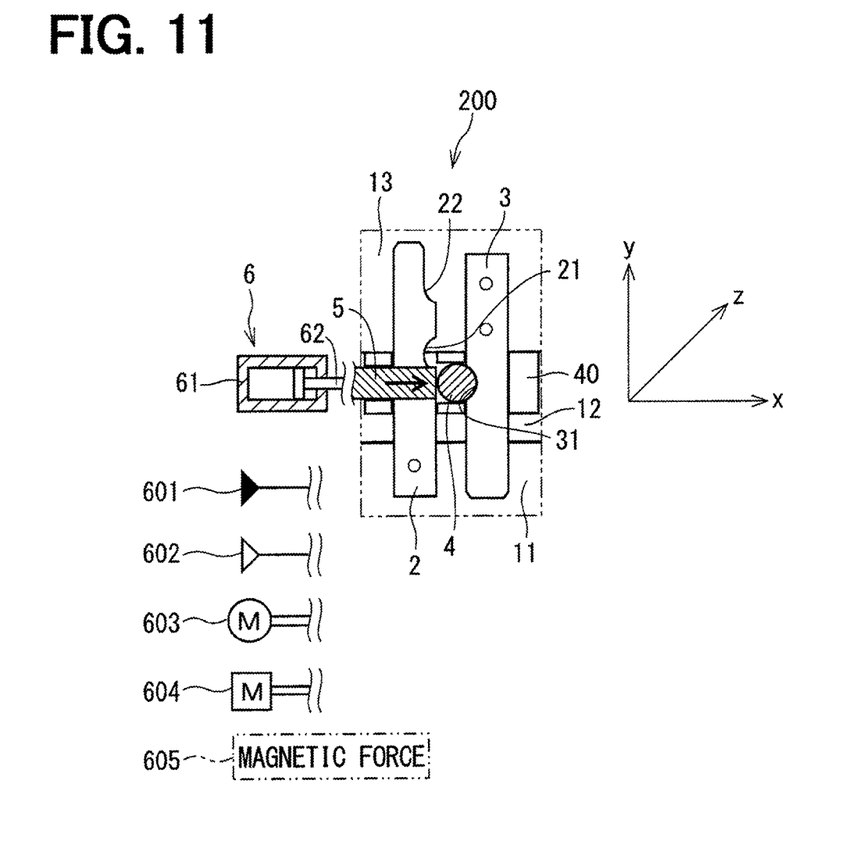
FIG. 11 is a schematic diagram illustrating a drive part according to another embodiment.

(1) The drive part 6 is not limited to be the air cylinder shown as the example in the above-described embodiment. For example, as shown in FIG. 11, the drive part 6 may be an actuator using any power source such as an air pressure 601, a hydraulic pressure 602, an electric motor power 603, an engine power 604, a magnetic force 605. A direction in which the restriction member 5 presses the lock pin 4 may be the molding die opening direction or the molding die closing direction (i.e., a direction y), which is a direction from the lower link bar 2 toward the upper link bar 3, or a longitudinal direction (i.e., a direction z) of the lock pin 4, other than a direction x from the lower link bar 2 toward the upper link bar 3. Moreover, more than one drive source may be used in combination to press the lock pin 4 in any directions.

(2) The lock member is not limited to be the lock pin 4 having a columnar shape and may be a member having a spherical or polygonal columnar shape. Correspondingly, the shapes of the first retaining groove 31 provided in the upper link bar 3 and the second retaining groove 21 provided in the lower link bar 2 are not limited to the arc shape.

(3) The shapes of the molding die 100 shown in FIG. 1 through FIG. 5 and the exchanging jig 9 shown in FIG. 6 are illustrated schematically for explanation. Structures and shapes of an actual molding die and an exchanging jig are normally more elaborate and complicated.

(4) The templates simultaneous exchanging operation in the die exchanging operation of the present disclosure includes a case of exchanging three of the templates 71, 72, 73 simultaneously and a case of exchanging two of the three templates 71, 72, 73 simultaneously.

The present disclosure is not limited to the above-described embodiment and can be modified within the scope of the present disclosure.

What is claimed is:

1. A molding die comprising:
a lower holder, an intermediate holder, and an upper holder that are stacked and configure a common case of the molding die;
a lower template, an intermediate template, and an upper template that are disposed in the lower holder, the intermediate holder, and the upper holder, respectively, to be replaceable;
a lock member, a movement of which in a molding die opening direction or a molding die closing direction is restricted by the intermediate holder, the lock member being supported to be movable in a mold dividing surface direction;
an upper link bar
that is attached to the upper holder to protrude from the upper holder toward the intermediate holder,
that has a first retaining groove, the lock member fitting in the first retaining groove when being located at a molding die closing position, and
that fixes the intermediate holder and the upper holder to each other when the lock member fits in the first retaining groove;
a lower link bar
that is attached to the lower holder to protrude from the lower holder toward the intermediate holder on a side opposite to the upper link bar with respect to the lock member,
that has a second retaining groove in which the lock member fits and a release portion that enables the lock member to be released from the first retaining groove when the lock member is located in the release portion,
that fixes the lower holder and the intermediate holder to be a specified first distance away from each other when the lock member fits in the second retaining groove, and
that releases the upper holder and the intermediate holder from being fixed to each other when the lock member is located at the release portion;
a restriction member being movable between a restriction position that prevents the lock member from fitting in the second retaining groove and a free position that enables the lock member to fit in the second retaining groove; and
a drive part that sets a position of the restriction member at the restriction position or the free position.

2. The molding die according to claim 1, wherein
the restriction member presses the lock member against the upper link bar from a side adjacent to the lower link bar when being located at the restriction position.

3. The molding die according to claim 1, wherein
the drive part is operated using an air pressure, a hydraulic pressure, an electric motor power, an engine power, or a magnetic force.

4. A die-exchanging method for the molding die according to claim 1, the die-exchanging method that exchanges more than one template of the lower template, the intermediate template, and the upper template, the die-exchanging method comprising:
lifting the intermediate holder and the upper holder, on a condition of being fixed to each other, integrally from the molding die closing position while the lock member fits in the first retaining groove;
fixing the lower holder and the intermediate holder to be the first distance away from each other in a manner that the restriction member is located at the restriction position and that the lock member is released from the first retaining groove and fits in the second retaining groove by lifting the intermediate holder in the molding die opening direction;
moving the upper holder in the molding die opening direction such that the intermediate holder and the upper holder are a specified second distance away from each other; and
exchanging the more than one template simultaneously using an exchanging jig that has support portions capable of supporting the more than one template simultaneously.

* * * * *

UNITED STATES PATENT AND TRADEMARK OFFICE
CERTIFICATE OF CORRECTION

PATENT NO. : 10,207,441 B2
APPLICATION NO. : 15/512250
DATED : February 19, 2019
INVENTOR(S) : Kawamura et al.

Page 1 of 1

It is certified that error appears in the above-identified patent and that said Letters Patent is hereby corrected as shown below:

On the Title Page

Column 1, (30) Foreign Application Priority Data, after Nov. 13, 2014 (JP) delete "2014-230697" and insert --2014-230691-- therefor.

Signed and Sealed this
Twenty-eighth Day of May, 2019

Andrei Iancu
*Director of the United States Patent and Trademark Office*